(12) United States Patent
Wei et al.

(10) Patent No.: US 12,641,614 B2
(45) Date of Patent: May 26, 2026

(54) SCHEDULING OF MULTIPLE TRANSPORT BLOCKS FOR GRANT-FREE UPLINK TRANSMISSION

(71) Applicant: QUALCOMM Incorporated, San Diego, CA (US)

(72) Inventors: Chao Wei, Beijing (CN); Changlong Xu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 552 days.

(21) Appl. No.: 17/309,875

(22) PCT Filed: Dec. 18, 2019

(86) PCT No.: PCT/CN2019/126184
§ 371 (c)(1),
(2) Date: Jun. 25, 2021

(87) PCT Pub. No.: WO2020/147492
PCT Pub. Date: Jul. 23, 2020

(65) Prior Publication Data
US 2022/0095359 A1 Mar. 24, 2022

(30) Foreign Application Priority Data
Jan. 14, 2019 (WO) ................ PCT/CN2019/071528

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 1/1822* (2013.01);
(Continued)

(58) Field of Classification Search
CPC .... H04W 72/23; H04W 72/02; H04L 1/1812; H04L 5/0048; H04L 1/1887; H04L 1/189;
(Continued)

(56) References Cited

U.S. PATENT DOCUMENTS

| 2010/0034153 A1 | 2/2010 | Lee et al. |
| 2017/0078073 A1 | 3/2017 | Abrahamsson et al. |

(Continued)

FOREIGN PATENT DOCUMENTS

| CN | 101132596 A | 2/2008 |
| CN | 101389113 A | 3/2009 |

(Continued)

OTHER PUBLICATIONS

International Search Report and Written Opinion—PCT/CN2019/071528—ISA/EPO—Sep. 27, 2019.
(Continued)

*Primary Examiner* — Omer S Mian
(74) *Attorney, Agent, or Firm* — Harrity & Harrity, LLP

(57) ABSTRACT

Various aspects of the present disclosure generally relate to wireless communication. In some aspects, a user equipment may receive configuration information that indicates a maximum number of transport blocks permitted to be transmitted in one or more transmission occasions in a transmission period of a configured grant for an uplink (UL) transmission; transmit, based at least in part on a set of transport blocks to be transmitted in the transmission period including fewer transport blocks than the maximum number of transport blocks, an indication to suppress communication of one or more remaining transport blocks of the transmission period other than the set of transport blocks; and perform the UL transmission of the set of transport blocks in the transmission period based at least in part on the configuration information. Numerous other aspects are provided.

24 Claims, 9 Drawing Sheets

(51) Int. Cl.

| | |
|---|---|
| *H04L 1/1822* | (2023.01) |
| *H04L 1/1867* | (2023.01) |
| *H04L 5/00* | (2006.01) |
| *H04W 72/02* | (2009.01) |

(52) U.S. Cl.
CPC ........... *H04L 1/1887* (2013.01); *H04L 1/189* (2013.01); *H04L 5/0048* (2013.01); *H04W 72/02* (2013.01)

(58) Field of Classification Search
CPC ... H04L 1/1822; H04L 5/0051; H04L 5/0055; H04L 5/0091
See application file for complete search history.

(56) References Cited

U.S. PATENT DOCUMENTS

| | | | | |
|---|---|---|---|---|
| 2017/0215080 | A1 | 7/2017 | Zhang | |
| 2019/0230691 | A1* | 7/2019 | Cao | H04L 5/0042 |
| 2019/0260520 | A1* | 8/2019 | Dong | H04L 1/1887 |
| 2019/0349966 | A1 | 11/2019 | Salem et al. | |
| 2021/0105833 | A1* | 4/2021 | Freda | H04L 5/0055 |
| 2021/0297193 | A1* | 9/2021 | Noh | H04L 1/1614 |
| 2021/0329626 | A1* | 10/2021 | Papasakellariou | H04L 5/0055 |
| 2022/0330312 | A1* | 10/2022 | Zhou | H04W 68/005 |
| 2022/0368574 | A1* | 11/2022 | Stern-Berkowitz | H04W 72/1268 |
| 2022/0369296 | A1* | 11/2022 | Hu | H04L 1/1861 |

FOREIGN PATENT DOCUMENTS

| | | | |
|---|---|---|---|
| CN | 102238627 | A | 11/2011 |
| CN | 103283155 | A | 9/2013 |
| CN | 104581981 | A | 4/2015 |
| CN | 108696943 | A | 10/2018 |
| EP | 3557934 | A1 | 10/2019 |
| WO | 2009046653 | A1 | 4/2009 |
| WO | 2018082572 | A1 | 5/2018 |
| WO | 2018084524 | A1 | 5/2018 |
| WO | 2018090861 | A1 | 5/2018 |
| WO | 2018107944 | A1 | 6/2018 |
| WO | 2018129017 | A2 | 7/2018 |

OTHER PUBLICATIONS

International Search Report and Written Opinion—PCT/CN2019/126184—ISA/EPO—Feb. 27, 2020.
"3rd Generation Partnership Project, Technical Specification Group Radio Access Network, NR, Physical layer procedures for data (Release 15)", 3GPP TS38.214, V15.3.0, 38214-F30, 3rd Generation Partnership Project (3GPP), Mobile Competence Centre, 650, Route Des Lucioles, F-06921 Sophia-Antipolis Cedex, France, Sep. 26, 2018, XP051515404, 96 Pages, Subsection 6.1.5.1 Subsection 6.1.5.2 Subsection 6.1.4.1 Section 6.1.4 Section 6.1.5.
Supplementary European Search Report—EP19910615—Search Authority—The Hague—Sep. 7, 2022.

* cited by examiner

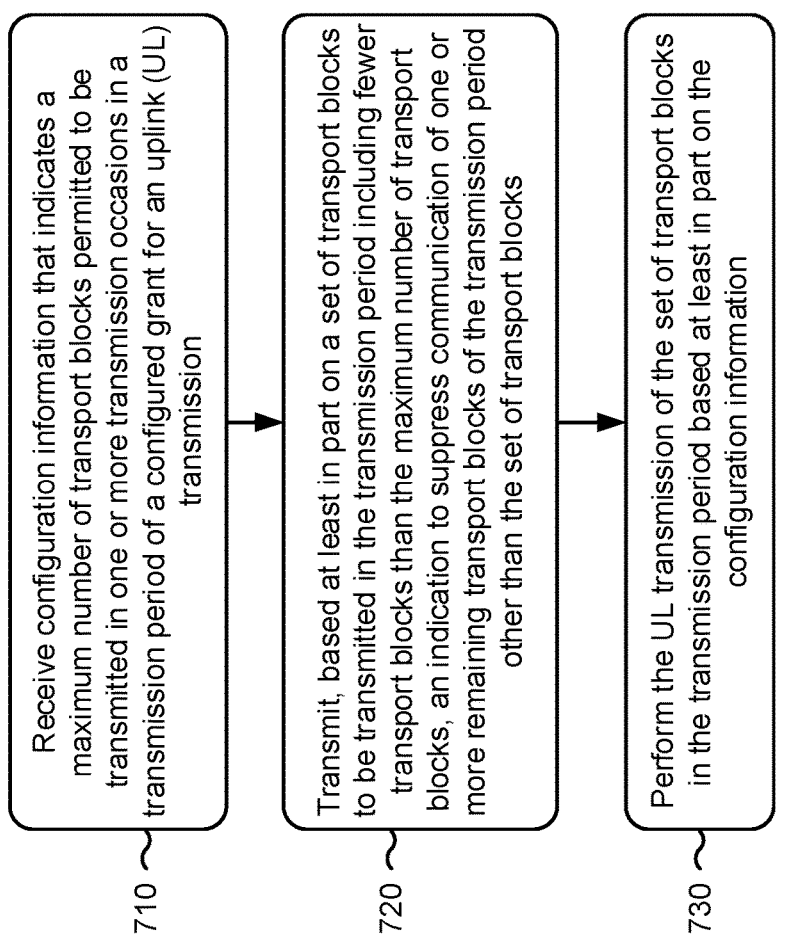

710   Receive configuration information that indicates a maximum number of transport blocks permitted to be transmitted in one or more transmission occasions in a transmission period of a configured grant for an uplink (UL) transmission 720   Transmit, based at least in part on a set of transport blocks to be transmitted in the transmission period including fewer transport blocks than the maximum number of transport blocks, an indication to suppress communication of one or more remaining transport blocks of the transmission period other than the set of transport blocks 730   Perform the UL transmission of the set of transport blocks in the transmission period based at least in part on the configuration information

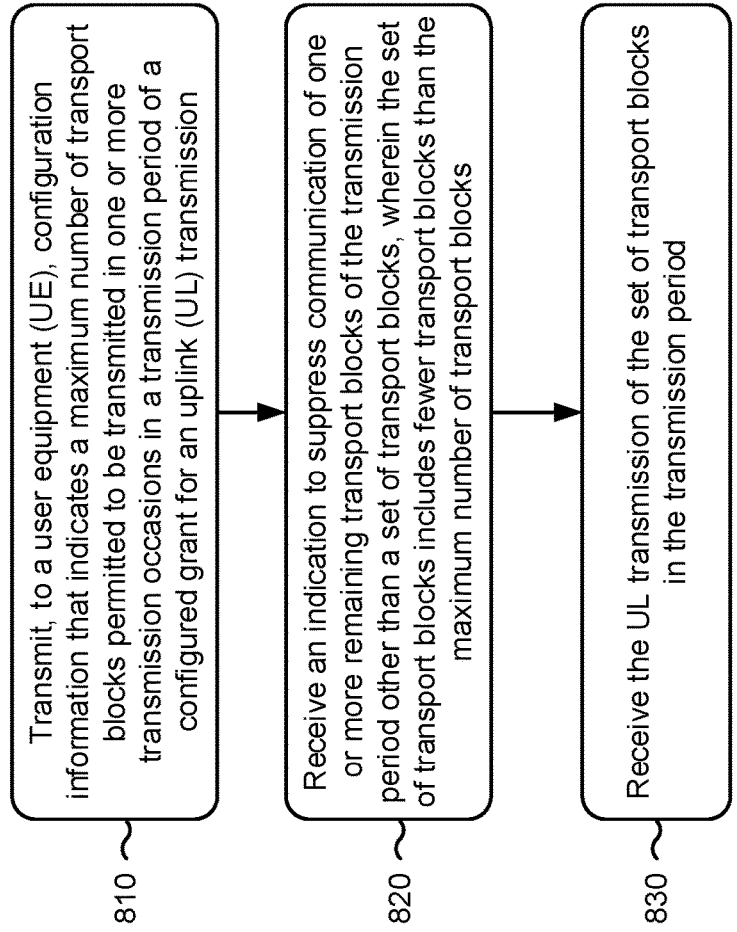

Transmit, to a user equipment (UE), configuration information that indicates a maximum number of transport blocks permitted to be transmitted in one or more transmission occasions in a transmission period of a configured grant for an uplink (UL) transmission

810

Receive an indication to suppress communication of one or more remaining transport blocks of the transmission period other than a set of transport blocks, wherein the set of transport blocks includes fewer transport blocks than the maximum number of transport blocks

820

Receive the UL transmission of the set of transport blocks in the transmission period

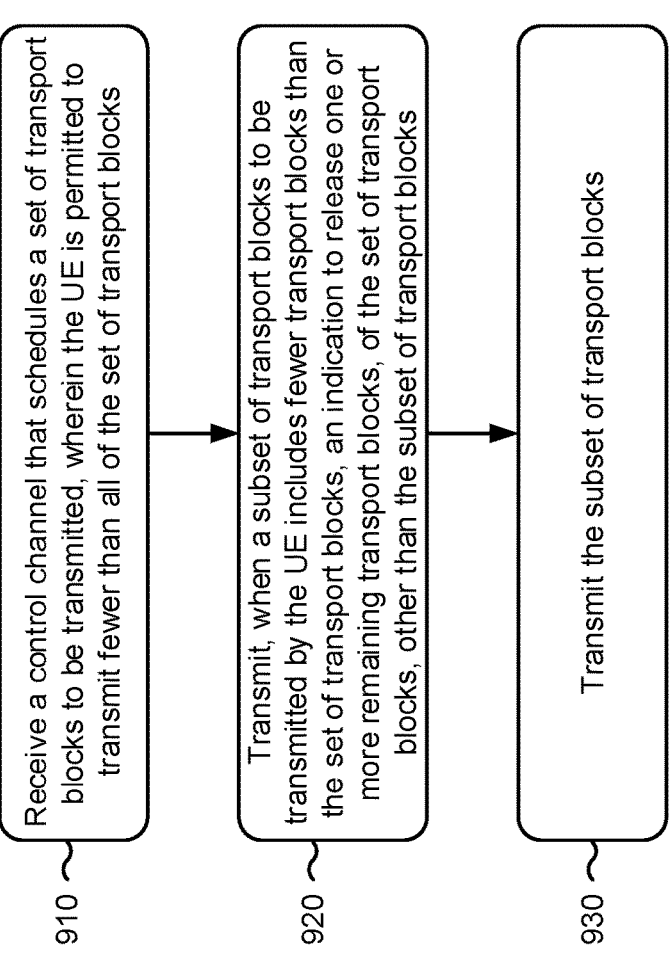

900

910 Receive a control channel that schedules a set of transport blocks to be transmitted, wherein the UE is permitted to transmit fewer than all of the set of transport blocks 920 Transmit, when a subset of transport blocks to be transmitted by the UE includes fewer transport blocks than the set of transport blocks, an indication to release one or more remaining transport blocks, of the set of transport blocks, other than the subset of transport blocks 930 Transmit the subset of transport blocks

FIG. 9

SCHEDULING OF MULTIPLE TRANSPORT BLOCKS FOR GRANT-FREE UPLINK TRANSMISSION

CROSS-REFERENCE TO RELATED APPLICATIONS

This application is a 371 national stage of PCT Application No. PCT/CN2019/126184 filed on Dec. 18, 2019, entitled "SCHEDULING OF MULTIPLE TRANSPORT BLOCKS FOR GRANT-FREE UPLINK TRANSMISSION," which claims priority to Patent Cooperation Treaty (PCT) Application No. PCT/CN2019/071528, filed on Jan. 14, 2019, entitled "SCHEDULING OF MULTIPLE TRANSPORT BLOCKS FOR GRANT-FREE UPLINK TRANSMISSION," which are hereby expressly incorporated by reference herein.

TECHNICAL FIELD

Aspects of the technology described below generally relate to wireless communication, and to techniques and apparatuses for scheduling of multiple transport blocks for grant-free uplink transmission. Some techniques and apparatuses described herein enable and provide wireless communication devices and systems configured for higher data rates, capacity, and/or spectral efficiency.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/ LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

In some aspects, a method of wireless communication, performed by a user equipment (UE), may include receiving configuration information that indicates a maximum number of transport blocks permitted to be transmitted in one or more transmission occasions in a transmission period of a configured grant for an uplink (UL) transmission; transmitting, based at least in part on a set of transport blocks to be transmitted in the transmission period including fewer transport blocks than the maximum number of transport blocks, an indication to suppress communication of one or more remaining transport blocks of the transmission period other than the set of transport blocks; and performing the UL transmission of the set of transport blocks in the transmission period based at least in part on the configuration information.

In some aspects, a method of wireless communication, performed by a base station, may include transmitting, to a UE, configuration information that indicates a maximum number of transport blocks permitted to be transmitted in one or more transmission occasions in a transmission period of a configured grant for a UL transmission; receiving an indication to suppress communication of one or more remaining transport blocks of the transmission period other than a set of transport blocks, wherein the set of transport blocks includes fewer transport blocks than the maximum number of transport blocks; and receiving the UL transmission of the set of transport blocks in the transmission period.

In some aspects, a UE for wireless communication may include memory and one or more processors operatively coupled to the memory. The memory and the one or more processors may be configured to receive configuration information that indicates a maximum number of transport blocks permitted to be transmitted in one or more transmission occasions in a transmission period of a configured grant for a UL transmission; transmit, based at least in part on a set of transport blocks to be transmitted in the transmission period including fewer transport blocks than the maximum number of transport blocks, an indication to suppress communication of one or more remaining transport blocks of the transmission period other than the set of transport blocks; and perform the UL transmission of the set of transport blocks in the transmission period based at least in part on the configuration information.

In some aspects, a base station for wireless communication may include memory and one or more processors operatively coupled to the memory. The memory and the one or more processors may be configured to transmit, to a UE, configuration information that indicates a maximum number of transport blocks permitted to be transmitted in one or more transmission occasions in a transmission period of a configured grant for a UL transmission; receive an indication to suppress communication of one or more remaining transport blocks of the transmission period other than a set of transport blocks, wherein the set of transport blocks includes fewer transport blocks than the maximum number of transport blocks; and receive the UL transmission of the set of transport blocks in the transmission period.

In some aspects, a non-transitory computer-readable medium may store one or more instructions for wireless communication. The one or more instructions, when executed by one or more processors of a UE, may cause the one or more processors to receive configuration information that indicates a maximum number of transport blocks permitted to be transmitted in one or more transmission occasions in a transmission period of a configured grant for a UL transmission; transmit, based at least in part on a set of transport blocks to be transmitted in the transmission period including fewer transport blocks than the maximum number of transport blocks, an indication to suppress communication of one or more remaining transport blocks of the transmission period other than the set of transport blocks; and perform the UL transmission of the set of transport blocks in the transmission period based at least in part on the configuration information.

In some aspects, an apparatus for wireless communication may include means for receiving configuration information that indicates a maximum number of transport blocks permitted to be transmitted in one or more transmission occasions in a transmission period of a configured grant for a UL transmission; means for transmitting, based at least in part on a set of transport blocks to be transmitted in the transmission period including fewer transport blocks than the maximum number of transport blocks, an indication to suppress communication of one or more remaining transport blocks of the transmission period other than the set of transport blocks; and means for performing the UL transmission of the set of transport blocks in the transmission period based at least in part on the configuration information.

In some aspects, a non-transitory computer-readable medium may store one or more instructions for wireless communication. The one or more instructions, when executed by one or more processors of a base station, may cause the one or more processors to transmit, to a UE, configuration information that indicates a maximum number of transport blocks permitted to be transmitted in one or more transmission occasions in a transmission period of a configured grant for a UL transmission; receive an indication to suppress communication of one or more remaining transport blocks of the transmission period other than a set of transport blocks, wherein the set of transport blocks includes fewer transport blocks than the maximum number of transport blocks; and receive the UL transmission of the set of transport blocks in the transmission period.

In some aspects, an apparatus for wireless communication may include means for transmitting, to a UE, configuration information that indicates a maximum number of transport blocks permitted to be transmitted in one or more transmission occasions in a transmission period of a configured grant for a UL transmission; means for receiving an indication to suppress communication of one or more remaining transport blocks of the transmission period other than a set of transport blocks, wherein the set of transport blocks includes fewer transport blocks than the maximum number of transport blocks; and means for receiving the UL transmission of the set of transport blocks in the transmission period.

In some aspects, a method of wireless communication, performed by a user equipment (UE), may include receiving configuration information that indicates a maximum number of transport blocks permitted to be transmitted in a transmission period of a repeating transmission; transmitting, when a set of transport blocks to be transmitted in the transmission period includes fewer transport blocks than the maximum number of transport blocks, an indication to release one or more remaining transport blocks of the transmission period other than the set of transport blocks;

and transmitting the set of transport blocks in the transmission period based at least in part on the configuration information.

In some aspects, a UE for wireless communication may include memory and one or more processors operatively coupled to the memory. The memory and the one or more processors may be configured to receive configuration information that indicates a maximum number of transport blocks permitted to be transmitted in a transmission period of a repeating transmission; transmit, when a set of transport blocks to be transmitted in the transmission period includes fewer transport blocks than the maximum number of transport blocks, an indication to release one or more remaining transport blocks of the transmission period other than the set of transport blocks; and transmit the set of transport blocks in the transmission period based at least in part on the configuration information.

In some aspects, a non-transitory computer-readable medium may store one or more instructions for wireless communication. The one or more instructions, when executed by one or more processors of a UE, may cause the one or more processors to receive configuration information that indicates a maximum number of transport blocks permitted to be transmitted in a transmission period of a repeating transmission; transmit, when a set of transport blocks to be transmitted in the transmission period includes fewer transport blocks than the maximum number of transport blocks, an indication to release one or more remaining transport blocks of the transmission period other than the set of transport blocks; and transmit the set of transport blocks in the transmission period based at least in part on the configuration information.

In some aspects, an apparatus for wireless communication may include means for receiving configuration information that indicates a maximum number of transport blocks permitted to be transmitted in a transmission period of a repeating transmission; means for transmitting, when a set of transport blocks to be transmitted in the transmission period includes fewer transport blocks than the maximum number of transport blocks, an indication to release one or more remaining transport blocks of the transmission period other than the set of transport blocks; and means for transmitting the set of transport blocks in the transmission period based at least in part on the configuration information.

In some aspects, a method of wireless communication, performed by a base station, may include transmitting, to a UE, configuration information that indicates a maximum number of transport blocks permitted to be transmitted in a transmission period of a repeating transmission; receiving an indication to release one or more remaining transport blocks of the transmission period other than a set of transport blocks, wherein the set of transport blocks includes fewer transport blocks than the maximum number of transport blocks; and receiving the set of transport blocks in the transmission period.

In some aspects, a base station for wireless communication may include memory and one or more processors operatively coupled to the memory. The memory and the one or more processors may be configured to transmit, to a UE, configuration information that indicates a maximum number of transport blocks permitted to be transmitted in a transmission period of a repeating transmission; receive an indication to release one or more remaining transport blocks of the transmission period other than a set of transport blocks, wherein the set of transport blocks includes fewer transport blocks than the maximum number of transport blocks; and receive the set of transport blocks in the transmission period.

In some aspects, a non-transitory computer-readable medium may store one or more instructions for wireless communication. The one or more instructions, when executed by one or more processors of a base station, may cause the one or more processors to transmit, to a UE, configuration information that indicates a maximum number of transport blocks permitted to be transmitted in a transmission period of a repeating transmission; receive an indication to release one or more remaining transport blocks of the transmission period other than a set of transport blocks, wherein the set of transport blocks includes fewer transport blocks than the maximum number of transport blocks; and receive the set of transport blocks in the transmission period.

In some aspects, an apparatus for wireless communication may include means for transmitting, to a UE, configuration information that indicates a maximum number of transport blocks permitted to be transmitted in a transmission period of a repeating transmission; means for receiving an indication to release one or more remaining transport blocks of the transmission period other than a set of transport blocks, wherein the set of transport blocks includes fewer transport blocks than the maximum number of transport blocks; and means for receiving the set of transport blocks in the transmission period.

In some aspects, a method of wireless communication, performed by a UE, may include receiving a control channel that schedules a set of transport blocks to be transmitted, wherein the UE is permitted to transmit fewer than all of the set of transport blocks; transmitting, when a subset of transport blocks to be transmitted by the UE includes fewer transport blocks than the set of transport blocks, an indication to release one or more remaining transport blocks, of the set of transport blocks, other than the subset of transport blocks; and transmitting the subset of transport blocks.

In some aspects, a UE for wireless communication may include memory and one or more processors operatively coupled to the memory. The memory and the one or more processors may be configured to receive a control channel that schedules a set of transport blocks to be transmitted, wherein the UE is permitted to transmit fewer than all of the set of transport blocks; transmit, when a subset of transport blocks to be transmitted by the UE includes fewer transport blocks than the set of transport blocks, an indication to release one or more remaining transport blocks, of the set of transport blocks, other than the subset of transport blocks; and transmit the subset of transport blocks.

In some aspects, a non-transitory computer-readable medium may store one or more instructions for wireless communication. The one or more instructions, when executed by one or more processors of a UE, may cause the one or more processors to receive a control channel that schedules a set of transport blocks to be transmitted, wherein the UE is permitted to transmit fewer than all of the set of transport blocks; transmit, when a subset of transport blocks to be transmitted by the UE includes fewer transport blocks than the set of transport blocks, an indication to release one or more remaining transport blocks, of the set of transport blocks, other than the subset of transport blocks; and transmit the subset of transport blocks.

In some aspects, an apparatus for wireless communication may include means for receiving a control channel that schedules a set of transport blocks to be transmitted, wherein the UE is permitted to transmit fewer than all of the set of transport blocks; means for transmitting, when a subset of transport blocks to be transmitted by the UE includes fewer transport blocks than the set of transport blocks, an indication to release one or more remaining transport blocks, of the set of transport blocks, other than the subset of transport blocks; and means for transmitting the subset of transport blocks.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

FIG. 7 is a diagram illustrating an example process performed, for example, by a user equipment, in accordance with various aspects of the present disclosure.

FIG. 8 is a diagram illustrating an example process performed, for example, by a base station, in accordance with various aspects of the present disclosure.

FIG. 9 is a diagram illustrating an example process performed, for example, by a user equipment, in accordance with various aspects of the present disclosure.

DETAILED DESCRIPTION

Figure 1:
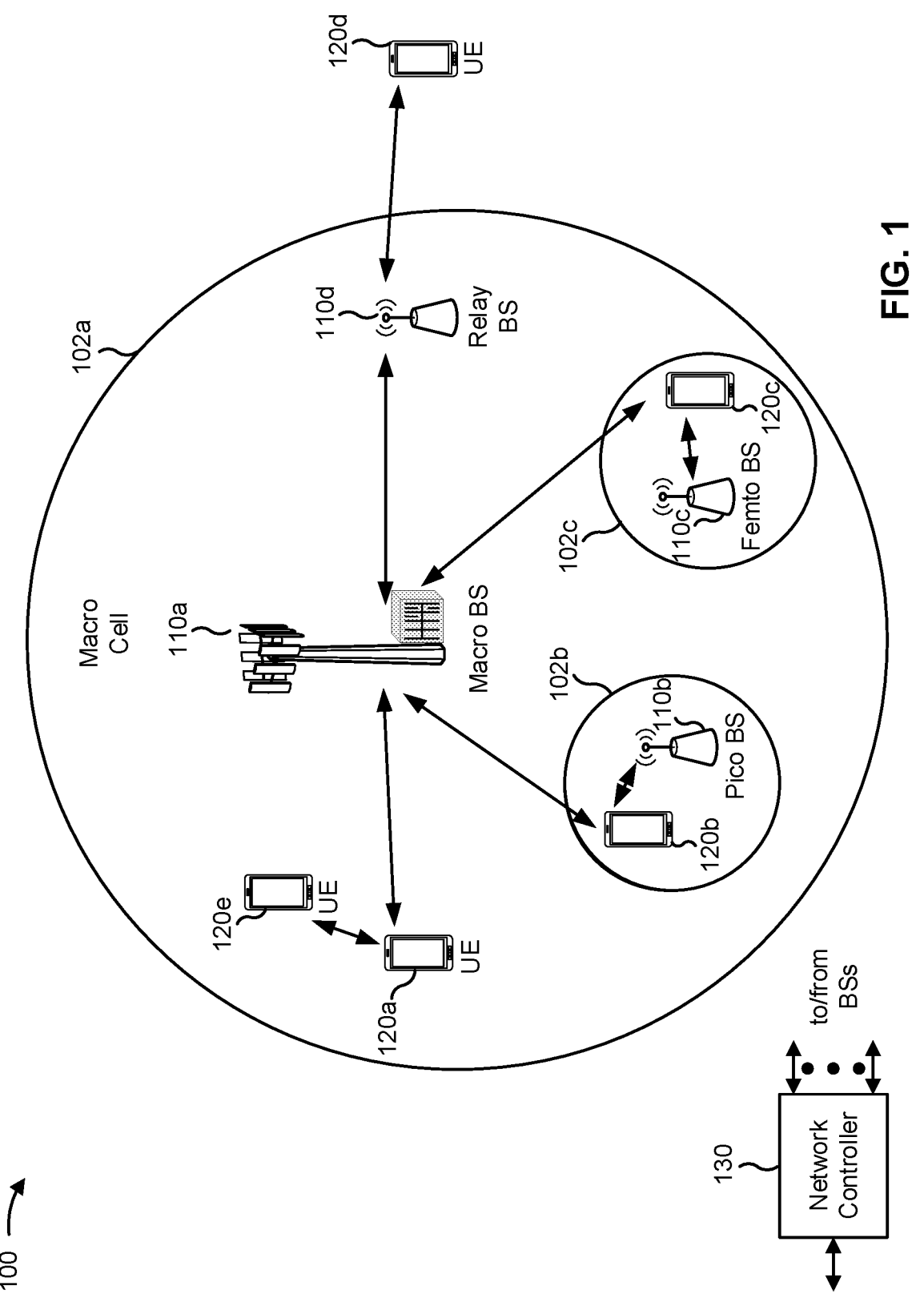
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
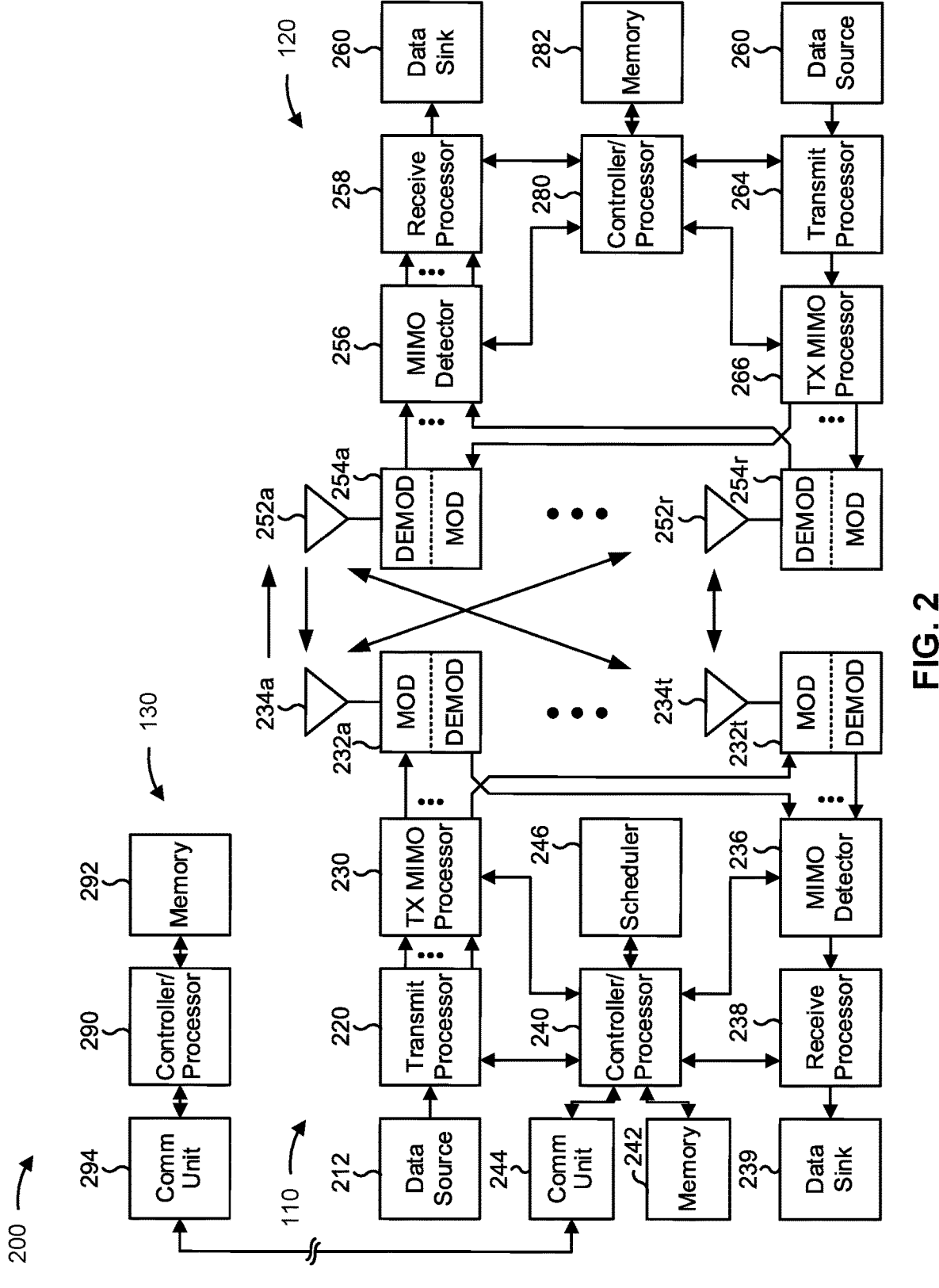
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with scheduling of multiple transport blocks for grant-free uplink transmission, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving configuration information that indicates a maximum number of transport blocks permitted to be transmitted in a transmission period of a repeating transmission; means for transmitting, when a set of transport blocks to be transmitted in the transmission period includes fewer transport blocks than the maximum number of transport blocks, an indication to release one or more remaining transport blocks of the transmission period other than the set of transport blocks; means for transmitting the set of transport blocks in the transmission period based at least in part on the configuration information; means for performing a retransmission of the set of transport blocks based at least in part on an uplink grant, wherein the uplink grant includes a code block group (CBG) transmission information field; means for transmitting the set of transport blocks without receiving an uplink grant or a Layer 1 signal indicating to transmit the set of transport blocks; means for transmitting the set of transport blocks based at least in part on an uplink grant or a Layer 1 signal indicating an activation of the repeated transmission of the set of transport blocks; means for receiving a control channel that schedules a set of transport blocks to be transmitted, wherein the UE is permitted to transmit fewer than all of the set of transport blocks; means for transmitting, when a subset of transport blocks to be transmitted by the UE includes fewer transport blocks than the set of transport blocks, an indication to release one or more remaining transport blocks, of the set of transport blocks, other than the subset of transport blocks; means for transmitting the subset of transport blocks; means for receiving configuration information that indicates a maximum number of transport blocks permitted to be transmitted in one or more transmission occasions in a transmission period of a configured grant for an uplink (UL) transmission; means for transmitting, based at least in part on a set of transport blocks to be transmitted in the transmission period including fewer transport blocks than the maximum number of transport blocks, an indication to suppress communication of one or more remaining transport blocks of the transmission period other than the set of transport blocks; means for performing the UL transmission of the set of transport blocks in the transmission period based at least in part on the configuration information; means for encoding the indication and the set of transport blocks using different encoding schemes; means for mapping the indication and the set of transport blocks to different resource elements; means for performing a retransmission of the set of transport blocks based at least in part on an uplink grant, wherein the uplink grant includes a code block group (CBG) transmission information field; and/or the like. In some aspects, such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, base station 110 may include means for transmitting, to a UE, configuration information that indicates a maximum number of transport blocks permitted to be transmitted in a transmission period of a repeating transmission; means for receiving an indication to release one or more remaining transport blocks of the transmission period other than a set of transport blocks, wherein the set of transport blocks includes fewer transport blocks than the maximum number of transport blocks; means for receiving the set of transport blocks in the transmission period; means for transmitting an uplink grant that includes a code block group (CBG) transmission information field; means for receiving a retransmission of the set of transport blocks based at least in part on the uplink grant; means for receiving the set of transport blocks without transmitting an uplink grant or a Layer 1 signal indicating to transmit the set of transport blocks; means for receiving the set of transport blocks based at least in part on an uplink grant or a Layer 1 signal indicating an activation of the repeated transmission of the set of transport blocks; means for receiving or scheduling a communication on the one or more remaining transport blocks based at least in part on the indication; means for transmitting, to a user equipment (UE), configuration information that indicates a maximum number of transport blocks permitted to be transmitted in one or more transmission occasions in a transmission period of a configured grant for an uplink (UL) transmission; means for receiving an indication to suppress communication of one or more remaining transport blocks of the transmission period other than a set of transport blocks, wherein the set of transport blocks includes fewer transport blocks than the maximum number of transport blocks; means for receiving the UL transmission of the set of transport blocks in the transmission period; means for transmitting an uplink grant that includes a code block group (CBG) transmission information field; means for receiving a retransmission of the set of transport blocks based at least in part on the uplink grant; means for receiving the set of transport blocks based at least in part on an uplink grant or a Layer 1 signal indicating an activation of the one or more transmission occasions; means for performing a different transmission than the transmission of the set of transport blocks using at least part of the one or more remaining transport blocks; and/or the like. In some aspects, such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

A UE may be configured with a grant-free resource allocation for an uplink transmission (e.g., an uplink shared channel, such as a physical uplink shared channel (PUSCH) and/or the like). For example, the UE may receive configuration information (e.g., radio resource control (RRC) configuration information and/or the like) that identifies the resource allocation. In some cases, the UE may perform the corresponding uplink transmission without receiving any form of Layer 1 signaling relating to the uplink transmission. This may be referred to as a Type 1 PUSCH without a grant. In this case, the configuration information may identify a time and frequency resource allocation, a modulation and coding scheme (MCS), a demodulation reference signal (DMRS) configuration, a periodicity and/or offset of the resource allocation, and/or the like. In other cases, the UE may perform the corresponding uplink transmission based at least in part on Layer 1 signaling that activates the uplink transmission. This may be referred to as a Type 2 PUSCH without a grant. In this case, the configuration information may indicate a periodicity of the resource allocation, and an exact time and/or frequency resource allocation may be based at least in part on an uplink grant associated with the Layer 1 signaling that activates the uplink transmission. Both of the above techniques may be used to schedule periodic transmissions, in which an uplink transmission is performed based at least in part on a transmission period. In both of the above cases, the UE may be permitted not to transmit a transport block on the assigned resource if there is no data to transmit in connection with the assigned resource.

In some cases, only a single transport block may be transmitted in each transmission period. However, when traffic other than that associated with the single transport block is to be transmitted by the UE, the UE may need to request additional resources for uplink transmission (e.g., using a scheduling request, a buffer status report, and/or the like). These additional resources may be configured via Layer 1 signaling, which diminishes the benefits of grant-free scheduling of the UE's communications and also increases transmission delay. This may not be acceptable for time-critical traffic with a tight requirement on latency. One solution is to allow multiple active grant configurations for supporting different traffic types and services (e.g., for voice traffic and for sporadic emergency message traffic), but this may not be resource-efficient since unused resources reserved for the grant-free uplink transmission may not be released for another type of transmission.

In some cases, a single downlink control information may schedule multiple transport blocks for grant-free uplink transmission. For example, multiple transport blocks may be scheduled for transmission in each transmission period. This may reduce downlink control channel (e.g., physical downlink control channel (PDCCH) and/or the like) overhead. However, in some cases, a UE may not use all of the transport blocks that are scheduled in a transmission period. In this case, it may be wasteful of resources if unused transport blocks are not used for other communications. However, a base station associated with the UE may not know whether the unused transport blocks will be used for their intended purpose. In this case, the base station may not be able to reuse the unused transport blocks, thereby wasting the resources of the unused transport blocks.

Some techniques and apparatuses described herein provide configuration of a maximum number of transport blocks to be transmitted in a transmission period for a grant-free communication. Furthermore, some techniques and apparatuses described herein provide signaling of one or more remaining (e.g., unused) transport blocks of the maximum number of transport blocks for a transmission period. Signaling of one or more remaining transport blocks may enable the reuse of the one or more remaining transport blocks for other traffic. Reusing the one or more remaining transport blocks for other traffic improves utilization of resources of the UE and the base station and conserves computing resources. Furthermore, some techniques and apparatuses described herein provide configuration of hybrid automatic repeat request (HARQ) feedback for the grant-free communication based at least in part on the maximum number of transport blocks. Configuring the HARQ feedback based at least in part on the maximum number of transport blocks avoids HARQ process mismatches, improves reliability of the communication link between the UE and the base station, and improves utilization of computing resources.

Figure 3:
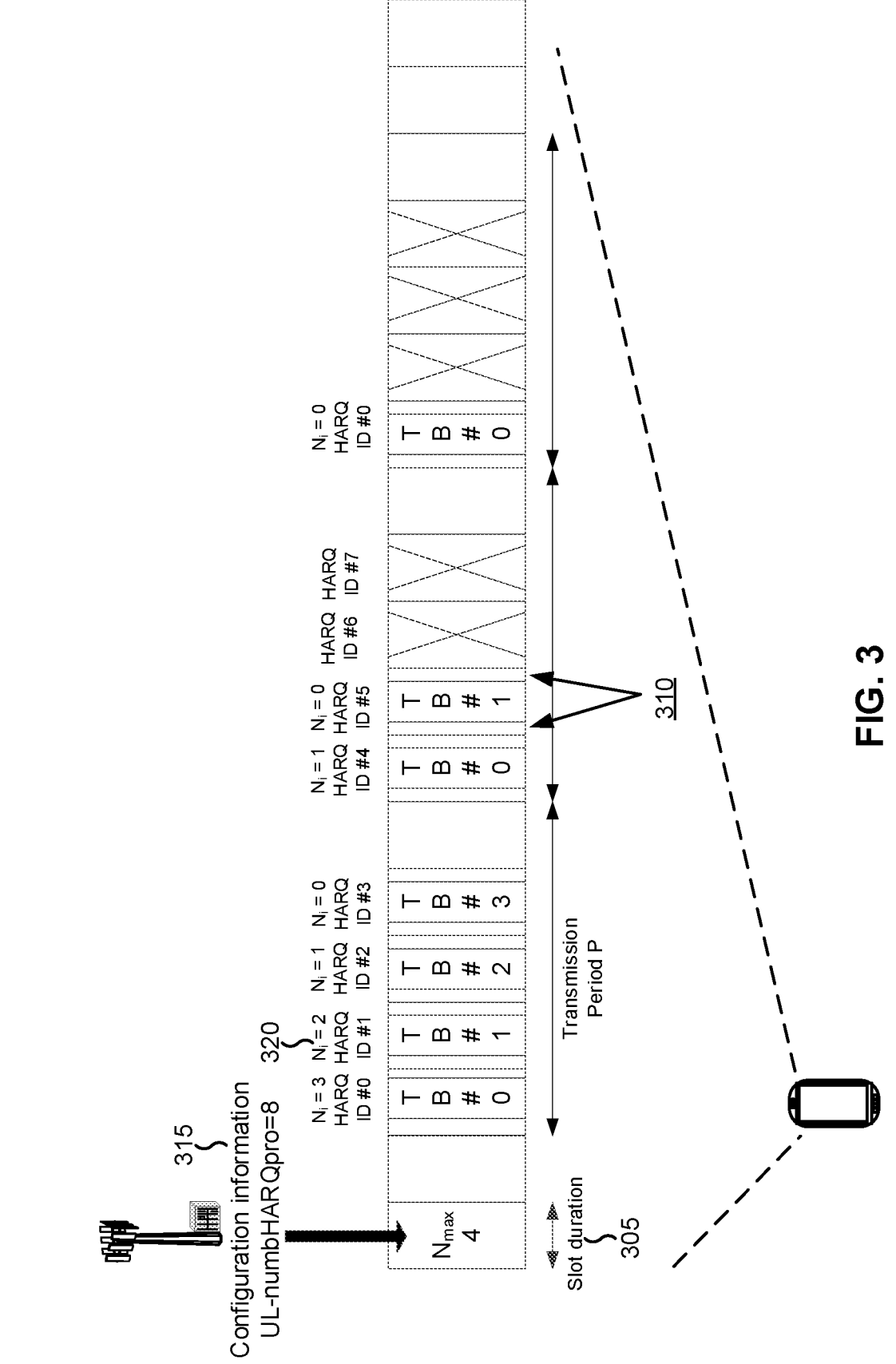
FIG. 3 is a diagram illustrating an example of signaling associated with multiple transport block scheduling for a Type 1 physical uplink shared channel (PUSCH) without grant configuration, in accordance with various aspects of the present disclosure.

FIG. 3 is a diagram illustrating an example 300 of signaling associated with multiple transport block scheduling for a Type 1 PUSCH without grant configuration, in accordance with various aspects of the present disclosure. The operations described in connection with example 300 may be performed by a UE (e.g., UE 120). As shown by reference number 305, FIG. 3 shows a series of rectangles representing slots. Various transport blocks (TBs) (indicated by TB #0 through TB #3) are transmitted in respective slots. Furthermore, each slot in which a transport block is transmitted may be associated with one or more starting symbols, in which control information, DMRS, and/or the like may be communicated, and one or more ending symbols, which may be a guard period and/or the like. The one or more starting symbols and the one or more ending symbols of one of the slots are shown by reference number 310.

As shown in FIG. 3, and by reference number 315, the UE may receive configuration information. For example, the configuration information may be for a repeating transmission of the UE. The configuration information may identify resource allocations for a plurality of transport blocks. In some aspects, the configuration information may identify a resource allocation of the repeating transmission, such as a time and/or frequency resource assignment, an MCS, HARQ configuration information, a DMRS configuration, a periodicity and/or offset of a transmission period (e.g., shown as P) of the repeating transmission, and/or the like.

As shown, the configuration information may identify a maximum number of transport blocks (e.g., $N_{max}$) that can be transmitted in a transmission period. Here, the maximum number of transport blocks is 4. The UE may transmit up to the maximum number of transport blocks in a transmission period. In some aspects, the UE may provide an indication that one or more remaining transport blocks of the transmission period will be unused by the UE. The indication is described in more detail below. In some aspects, the base station may receive or schedule another communication on the resources associated with one or more remaining transport blocks based at least in part on the indication. For example, the base station may receive a communication that is transmitted by the UE, may schedule a communication to be performed by the UE or another UE, and/or the like. Thus, utilization of the resources of the repeating communication may be improved relative to dropping the one or more remaining transport blocks without scheduling another communication to be performed on the resources associated with one or more remaining transport blocks.

In some aspects, the indication may be based at least in part on a DMRS pattern of a front-loaded DMRS of a transport block. For example, the indication may be based at least in part on a cyclic shift for a DMRS, a comb pattern of a DMRS, a sequence for a DMRS, and/or the like. In such a case, a first DMRS pattern may indicate that no more transport blocks are to be transmitted after the transport block associated with the DMRS, and a second DMRS pattern may indicate that one or more additional transport blocks are to be transmitted after the transport blocks associated with the DMRS. In some aspects, multiple different DMRS patterns may be used to indicate how many additional transport blocks are to be transmitted (e.g., a first pattern may indicate one more transport block, a second pattern may indicate two more transport blocks, and so on). By indicating whether additional transport blocks are to be transmitted using the DMRS, signaling resources may be conserved that would otherwise be used for other communications. Furthermore, using the front-loaded DMRS allows the base station to detect whether the UE is to transmit additional transport blocks and determine whether to reuse the resources of the transmission period before the start of the next slot or mini-slot.

In some aspects, the indication may be based at least in part on an explicit indication. In some aspects, the indication may be transmitted at a beginning of a transport block (e.g., in the one or more starting symbols), and may indicate whether one or more other transport blocks are to be transmitted after the transport block. In some aspects, the indication may indicate how many more transport blocks are to be transmitted in the transmission period. Here, the indication is shown as $N_i$ (e.g., reference number 320), where a value of $N_i$ indicates how many more transport blocks are to be transmitted in the current transmission period. Alternatively, the value of $N_i$ indicates an actual number of transport blocks, of the set of transport blocks, to be transmitted in the transmission period. For example, the indication shown by reference number 320 has a value of 2, since TB #2 and TB #3 have yet to be transmitted in the transmission period in which the indication shown by reference number 320 is included. In some aspects, the indication may have N bits, wherein a value of N is based at least in part on the maximum number of transport blocks (e.g., $N_{max}$). For example, here, since $N_{max}$ is 4, 2 bits may be used (e.g., $2^N=4$). In some aspects, the N-bit indication may be deterministically multiplexed with the transport block. For example, the indication may be multiplexed on the PUSCH in a fashion similar to uplink control information (UCI) multiplexing on the PUSCH to allow the base station to decode the indication before decoding the PUSCH or the transport block. As another example, the indication and the set of transport blocks may be encoded using different encoding schemes, and the indication and the set of transport blocks may be mapped to different resource elements. This may reduce delay associated with determining the one or more remaining transport blocks and provide the base station with the time needed to re-allocate the one or more remaining transport blocks for other traffic.

As shown, the configuration information may identify a maximum number of HARQ processes of the repeating transmission (e.g., UL-numbHARQpro). Here, the maximum number of HARQ processes is 8. The UE may use the information identifying the maximum number of HARQ processes to assign HARQ identifiers (sometimes referred to as HARQ process numbers) to the transport blocks and perform the HARQ process. Here, TB #0 is associated with a HARQ identifier 0, TB #1 is associated with a HARQ identifier 1, and so on. Furthermore, a transmission of TB #0 in a second transmission period is associated with a HARQ identifier 4, a transmission of TB #1 in the second transmission period is associated with a HARQ identifier 5, and so on.

The UE may determine which HARQ process number is to be assigned based at least in part on the maximum number of HARQ processes (e.g., UL-numbHARQpro, the maximum number of transport blocks in a transmission period (e.g., $N_{max}$), a time-domain resource allocation for the transport block, and/or the like. For example, the HARQ process numbers for a set of M transport blocks of a transmission period may be assigned as: HARQ Process number=(floor (X/UL-periodicity)*$N_{max}$+m) (mod UL-numbHARQpro), where m=0, 1, $N_{max}$−1 is the transport block index in a transmission period, and where X refers to the symbol index of the first transport block transmission of the transmission period, i.e., X=(System Frame Number (SFN)*SlotPerFrame*SymbolPerSlot+ Slot_index_In_SF*SymbolPerSlot+Symbol_Index_In_ Slot), and where UL-periodicity is the configured periodicity. Thus, the determination of the HARQ process number may take into account non-transmitted transport blocks (as shown in FIG. 3) so as to avoid misalignment between HARQ process numbers of the UE and the base station.

In some aspects, the UE may perform retransmission of one or more transport blocks of the transmission period. In this case, the UE may perform the retransmission based at least in part on a dynamic uplink grant (e.g., a grant-based PUSCH). If scheduling of a multiple-transport-block transmission is supported for the grant-based PUSCH, then a single downlink control information (DCI) may schedule retransmission of multiple transport blocks of the repeating transmission. If scheduling of a multiple-transport-block transmission is not supported for the grant-based PUSCH and a code block group (CBG) based PUSCH transmission is configured for the UE, then the UE may use the CBG transmission information (CBGTI) field to indicate which group of transport blocks are to be retransmitted. For example, the UE may partition $N_{max}$ transport blocks into Y CBGs, wherein $N_{max}$ is the configured maximum number of transport blocks that can be transmitted in a transmission period and Y is the maximum number of CBGs configured for the UE (e.g., by a higher layer). Each bit in the CBGTI field may indicate whether a group of transport blocks is to be retransmitted. For example, the group of transport blocks may include floor($N_{max}$/Y) transport blocks, ceil($N_{max}$/Y) transport blocks, or a different number of transport blocks. If both scheduling of multiple-transport-block transmissions and CBG-based transmission are not supported for the grant-based PUSCH, then one DCI may be used per transport block.

In some aspects, the transport blocks of the repeating communication may be transmitted using a continuous set of slots or a continuous set of mini-slots (e.g., with no slots or no mini-slots in between the slots or mini-slots of the transport blocks). In some aspects, the transport blocks of the repeating communication may be transmitted using a discontinuous set of slots or a discontinuous set of mini-slots (e.g., with one or more slots or one or more mini-slots in between the slots or mini-slots of the transport blocks). In the case of the discontinuous transmission, the gap between multiple transport blocks may be a fixed offset. In some aspects, the gap between two transmission occasions is based at least in part on a processing time for receiving the indication. For example, the gap may be configured by higher-layer signaling, such as the configuration information and/or the like.

As indicated above, FIG. 3 is provided as an example. Other examples may differ from what is described with respect to FIG. 3.

Figure 4:
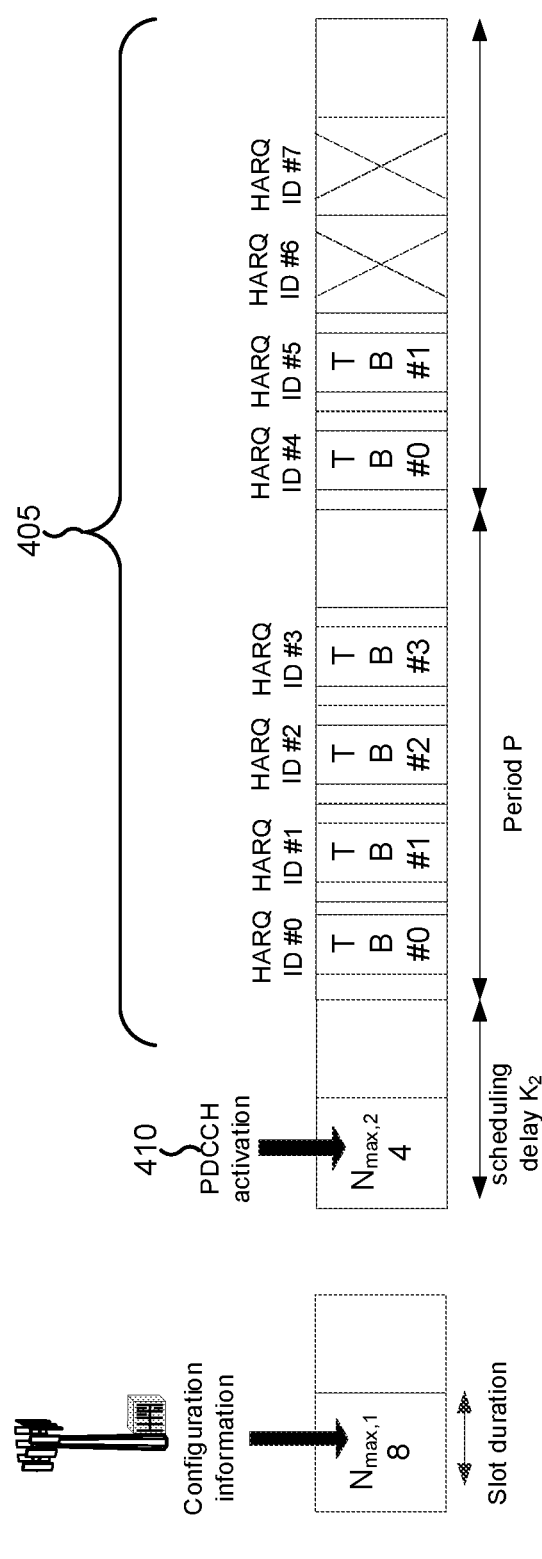
FIG. 4 is a diagram illustrating an example of signaling associated with multiple transport block scheduling for a Type 2 PUSCH without grant configuration, in accordance with various aspects of the present disclosure.

FIG. 4 is a diagram illustrating an example 400 of signaling associated with multiple transport block scheduling for a Type 2 PUSCH without grant configuration, in accordance with various aspects of the present disclosure. As shown in FIG. 4, the UE may receive, from a base station, configuration information identifying a maximum number of transport blocks that can be transmitted in a transmission period ($N_{max,1}$). Here, the maximum number is 8. Furthermore, the configuration information may include information for scheduling the repeating transmission shown by reference number 405, as described in more detail elsewhere herein.

As shown by reference number 410, the UE may receive, from the base station, an uplink grant or a Layer 1 signal (e.g., a PDCCH, in this case) that indicates an activation of the repeated transmission after a scheduling delay $K_2$. As further shown, the uplink grant or the Layer 1 signal may include information indicating a diminished maximum number of transport blocks that can be transmitted in a transmission period ($N_{max},2$). As can be seen, the UE may transmit up to the diminished maximum number of transport blocks in each transmission period. In some aspects, the UE may provide an indication to release one or more remaining transport blocks of the transmission period (e.g., a DMRS pattern, an explicit indication, etc.) (not shown in FIG. 4), as described in more detail elsewhere herein. Thus, the versatility of configuration of the repeating transmission may be improved. For example, the base station may allocate, using the configuration information, a maximum number of transport blocks, and may constrain the maximum number using the activation indication so that resources are more efficiently utilized. In this way, utilization of resources of the UE and the base station may be improved.

As indicated above, FIG. 4 is provided as an example. Other examples may differ from what is described with respect to FIG. 4.

Figure 5:
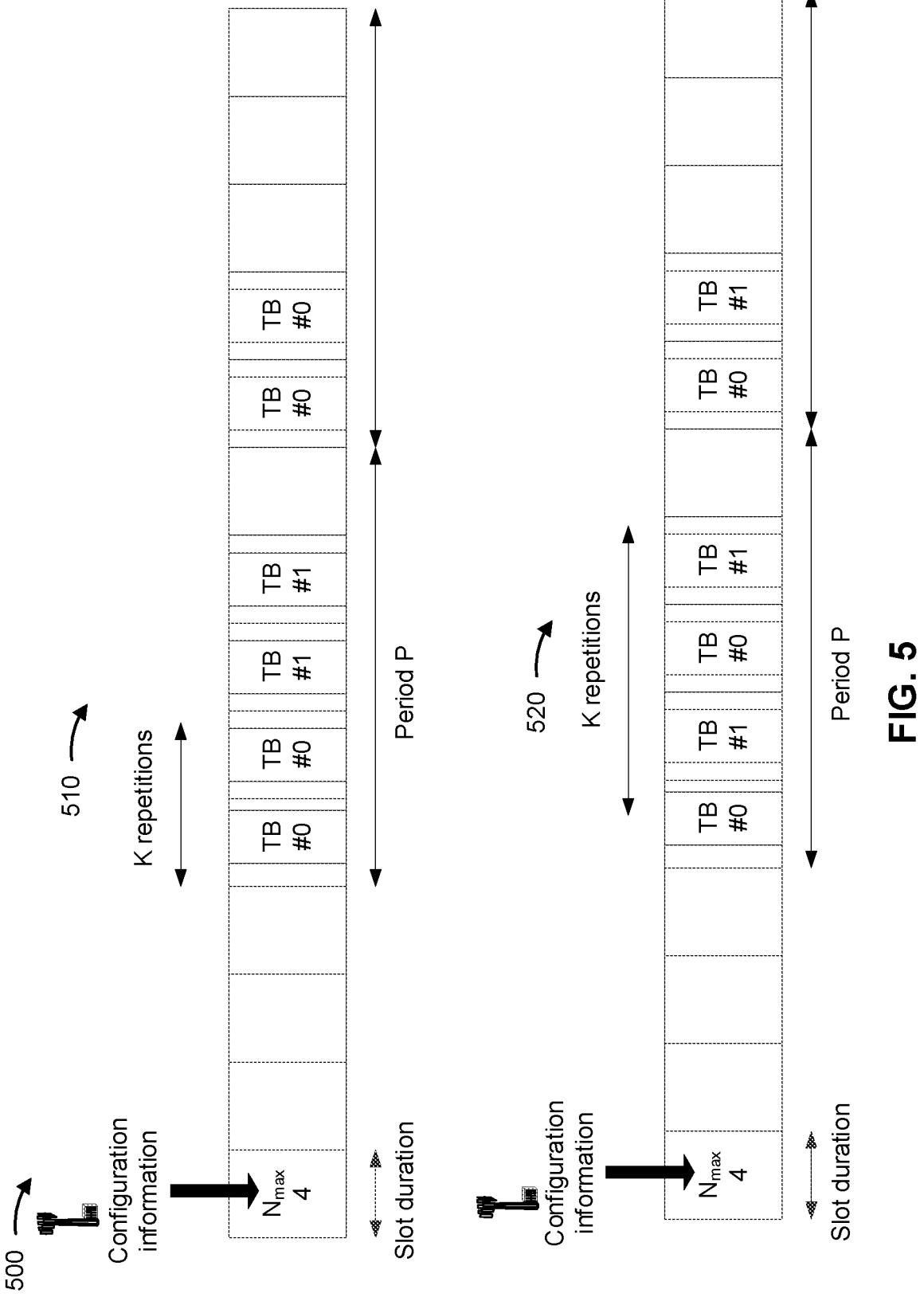
FIG. 5 is a diagram illustrating examples of arrangements of repetitions of transport blocks for a grant-free multiple transport block communication, in accordance with various aspects of the present disclosure.

FIG. 5 is a diagram illustrating examples 500 of arrangements of repetitions of transport blocks for a grant-free multiple transport block communication, in accordance with various aspects of the present disclosure. FIG. 5 shows a first arrangement 510 and a second arrangement 520. In the first arrangement 510, K repetitions of a first transport block (e.g., TB #0) are performed in a first transmission period, and K transmissions of a second transport block (e.g., TB #1) are performed in the first transmission period. In the first arrangement 510, the repetitions of the first transport block and the second transport block are not interleaved with each other. In the second arrangement 520, the K repetitions of the first transport block and the second transport block are interleaved with each other in the transmission period P. Non-interleaved repetition may provide more simplified decoding than interleaved repetition, whereas interleaved repetition may provide improved time diversity relative to non-interleaved repetition.

As indicated above, FIG. 5 is provided as an example. Other examples may differ from what is described with respect to FIG. 5.

Figure 6:
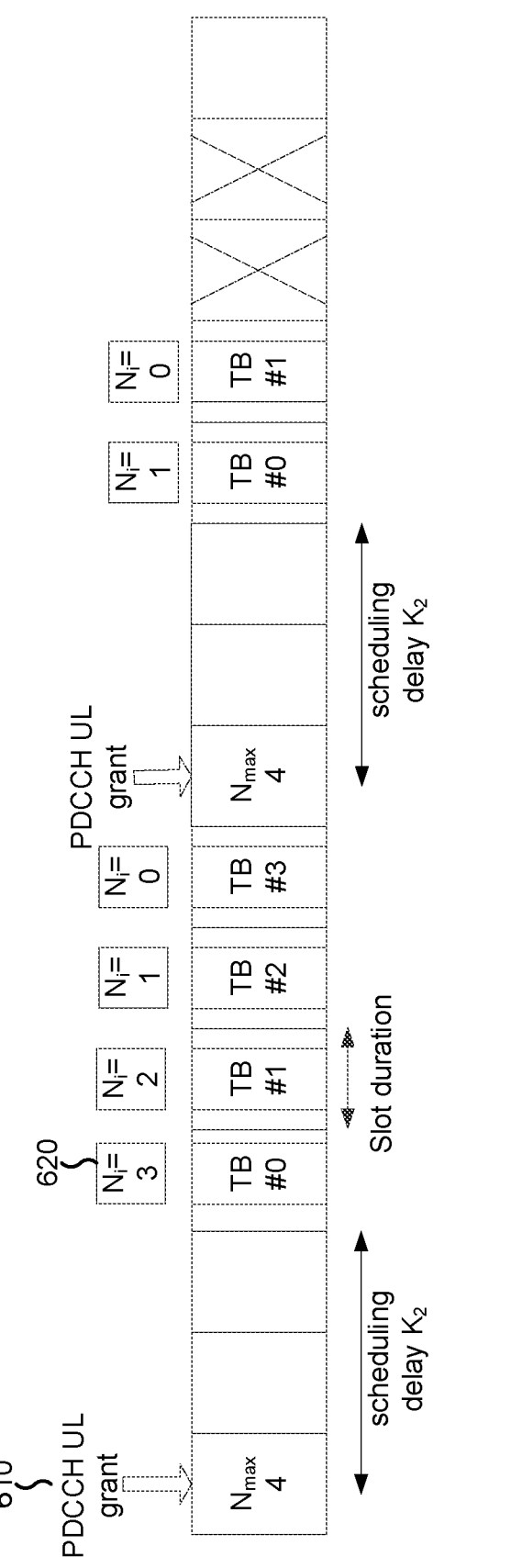
FIG. 6 is a diagram illustrating an example of signaling associated with multiple transport block scheduling for a grant-based communication, in accordance with various aspects of the present disclosure.

FIG. 6 is a diagram illustrating an example 600 of signaling associated with multiple transport block scheduling for a grant-based communication, in accordance with various aspects of the present disclosure. As shown in FIG. 6, and by reference number 610, a UE may receive a grant (e.g., a PDCCH uplink (UL) grant). As further shown, the grant may indicate a maximum number of transport blocks of a set of transport blocks to be transmitted by the UE (e.g., $N_{max}$=4). As shown by reference number 620, the UE may provide an indication, with each transport block, of a remaining number of transport blocks of the set of transport blocks that the UE is to transmit. Thus, when the remaining number of transport blocks indicates that one or more transport blocks are to be unused by the UE, the base station may determine that the one or more transport blocks are to be released. In this way, the UE may provide an indication that one or more remaining transport blocks are to be unused, which may permit the base station to allocate the one or more remaining transport blocks for other purposes.

As indicated above, FIG. 6 is provided as an example. Other examples may differ from what is described with respect to FIG. 6.

FIG. 7 is a diagram illustrating an example process 700 performed, for example, by a UE, in accordance with various aspects of the present disclosure. Example process 700 is an example where a UE (e.g., UE 120) performs signaling for configuration and performance of a grant-free uplink transmission.

As shown in FIG. 7, in some aspects, process 700 may include receiving configuration information that indicates a maximum number of transport blocks permitted to be transmitted in one or more transmission occasions in a transmission period of a configured grant for an uplink (UL) transmission (block 710). For example, the UE (e.g., using antenna 252, DEMOD 254, MIMO detector 256, receive processor 258, controller/processor 280, and/or the like) may receive configuration information. The configuration information may indicate a maximum number of transport blocks permitted to be transmitted in a transmission period of a configured grant for an uplink (UL) transmission. In some aspects, process 700 may include receiving configuration information that indicates a maximum number of transport blocks permitted to be transmitted in a transmission period of a repeating transmission.

As shown in FIG. 7, in some aspects, process 700 may include transmitting, based at least in part on a set of transport blocks to be transmitted in the transmission period including fewer transport blocks than the maximum number of transport blocks, an indication to suppress communication of one or more remaining transport blocks of the transmission period other than the set of transport blocks (block 720). For example, the UE (e.g., using controller/processor 280, transmit processor 264, TX MIMO processor 266, MOD 254, antenna 252, and/or the like) may transmit an indication to release one or more remaining transport blocks of the transmission period other than the set of transport blocks. The UE may transmit the indication when the set of transport blocks includes fewer transport blocks than the maximum number of transport blocks. In some aspects, the UE may transmit an indication of a number of remaining transport blocks of the transmission period. For example, the UE may transmit the indication with each transport block of the transmission period. In this case, the indication may implicitly indicate to suppress communication of the one or more remaining transport blocks when the set of transport blocks includes fewer transport blocks than the maximum number of transport blocks. In some aspects, process 700 may include transmitting, when a set of transport blocks to be transmitted in the transmission period includes fewer transport blocks than the maximum number of transport blocks, an indication to release one or more remaining transport blocks of the transmission period other than the set of transport blocks. As used herein, an indication that indicates to suppress communication may refer to an indication indicating that the UE is not to transmit the one or more remaining transport blocks, and that the BS is not to receive the one or more remaining transport blocks from the UE.

As shown in FIG. 7, in some aspects, process 700 may include performing the UL transmission of the set of transport blocks in the transmission period based at least in part on the configuration information (block 730). For example, the UE (e.g., using controller/processor 280, transmit processor 264, TX MIMO processor 266, MOD 254, antenna 252, and/or the like) may transmit the set of transport blocks in the transmission period based at least in part on the configuration information. In some aspects, process 700 may include transmitting the set of transport blocks in the transmission period based at least in part on the configuration information.

Process 700 may include additional aspects, such as any single aspect or any combination of aspects described below and/or in connection with one or more other processes described elsewhere herein.

In a first aspect, the one or more transmission occasions include a non-continuous group of slots or a non-continuous group of mini-slots.

In a second aspect, alone or in combination with the first aspect, a time gap between two transmission occasions is based at least in part on a processing time for receiving the indication.

In a third aspect, alone or in combination with one or more of the first and second aspects, the indication includes a front-loaded demodulation reference signal (DMRS).

In a fourth aspect, alone or in combination with one or more of the first through third aspects, the indication is a one-bit indication, and a DMRS pattern of the indication indicates that the one or more remaining transport blocks are to be suppressed in the transmission period after a transport block associated with the front-loaded DMRS.

In a fifth aspect, alone or in combination with one or more of the first through fourth aspects, the DMRS pattern includes at least one of a DMRS sequence, a cyclic shift, or a transmission comb value.

In a sixth aspect, alone or in combination with one or more of the first through fifth aspects, the indication is an N bit indication and a value of N is based at least in part on an actual number of transport blocks, of the set of transport blocks, to be transmitted in the transmission period.

In a seventh aspect, alone or in combination with one or more of the first through sixth aspects, the process 700 may include transmitting the indication comprises encoding the indication and the set of transport blocks using different encoding schemes; and mapping the indication and the set of transport blocks to different resource elements.

In an eighth aspect, alone or in combination with one or more of the first through seventh aspects, respective hybrid automatic repeat request (HARQ) process numbers of the set of transport blocks are continuous.

In a ninth aspect, alone or in combination with one or more of the first through eighth aspects, a starting HARQ process number of the set of transport blocks is determined based at least in part on one or more of a periodicity of the one or more transmission occasions, the maximum number of transport blocks, or an absolute time index of the transmission.

In a tenth aspect, alone or in combination with one or more of the first through ninth aspects, the starting HARQ process number is based at least in part on an actual number of transport blocks included in the set of transport blocks.

In an eleventh aspect, alone or in combination with one or more of the first through tenth aspects, the process 700 may include performing a retransmission of the set of transport blocks based at least in part on an uplink grant, wherein the uplink grant includes a code block group (CBG) transmission information field.

In a twelfth aspect, alone or in combination with one or more of the first through eleventh aspects, the retransmission of the set of transport blocks is based at least in part on a CBG based configuration, wherein each bit in the CBG transmission information field indicates a respective subset of transport blocks for retransmission.

In a thirteenth aspect, alone or in combination with one or more of the first through twelfth aspects, when a CBG based configuration is not supported by the UE, the uplink grant comprises downlink control information for retransmission of a single transport block of the set of transport blocks.

In a fourteenth aspect, alone or in combination with one or more of the first through thirteenth aspects, the configuration information includes one or more of a radio resource control (RRC) signal, or a Layer 1 signal indicating an activation of the configured grant uplink transmission of the set of transport blocks.

In a fifteenth aspect, alone or in combination with one or more of the first through fourteenth aspects, the indication is transmitted in an earliest available resource after determining that the set of transport blocks includes fewer transport blocks than the maximum number of transport blocks.

In a sixteenth aspect, alone or in combination with one or more of the first through fifteenth aspects, the UE is permitted transmit fewer than the maximum number of transport blocks.

In a seventeenth aspect, alone or in combination with one or more of the first through sixteenth aspects, the indication identifies the one or more remaining transport blocks or the set of transport blocks.

In some aspects, the set of transport blocks is transmitted in a continuous group of slots or a continuous group of mini-slots. In some aspects, a gap between two transport blocks of the set of transport blocks is fixed. In some aspects, the set of transport blocks is transmitted in a non-continuous group of slots or a non-continuous group of mini-slots. In some aspects, the set of transport blocks is transmitted in an interleaved pattern with another set of transport blocks.

In some aspects, the indication includes a front-loaded demodulation reference signal (DMRS). In some aspects, the indication uses a first DMRS pattern, and wherein a second DMRS pattern indicates that the one or more additional transport blocks are to be transmitted in the transmission period after the transport block associated with the DMRS. In some aspects, the DMRS pattern includes at least one or more of a DMRS sequence, a cyclic shift, or a transmission comb value. In some aspects, the indication is an N bit indicator and a value of N is based at least in part on a number of the one or more remaining transport blocks to be transmitted in the transmission period. In some aspects, the indication is multiplexed with an uplink shared channel of the set of transport blocks to permit the indication to be decoded before the uplink shared channel is decoded.

In some aspects, each transport block of the set of transport blocks is associated with a respective hybrid automatic repeat request (HARQ) process number. In some aspects, a HARQ process number of a particular transport block of the set of transport blocks is determined based at least in part on one or more of a configured maximum number of HARQ processes, the maximum number of transport blocks, or a time-domain resource allocation for the transport block. In some aspects, the HARQ process number is based at least in part on the one or more remaining transport blocks of the maximum number of transport blocks.

In some aspects, the UE may perform a retransmission of the set of transport blocks based at least in part on an uplink grant, wherein the uplink grant includes a code block group (CBG) transmission information field. In some aspects, the retransmission of the set of transport blocks is based at least in part on a CBG based configuration, wherein each bit in the CBG information field indicates a subset of transport blocks for retransmission. In some aspects, when a CBG based configuration is not supported by the UE, the uplink grant comprises downlink control information for a single transport block of the set of transport blocks. In some aspects, transmitting the set of transport blocks in the transmission period based at least in part on the configuration information comprises: transmitting the set of transport blocks without receiving an uplink grant or a Layer 1 signal indicating to transmit the set of transport blocks. In some aspects, transmitting the set of transport blocks in the transmission period based at least in part on the configuration information comprises: transmitting the set of transport blocks based at least in part on an uplink grant or a Layer 1 signal indicating an activation of the repeated transmission of the set of transport blocks. In some aspects, the grant or the Layer 1 signal indicates a diminished maximum number of transport blocks relative to the maximum number of transport blocks indicated by the configuration information, and the transmission of the set of transport blocks includes fewer transport blocks than the diminished maximum number of transport blocks.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with various aspects of the present disclosure. Example process 800 is an example where a base station (e.g., BS 110) performs signaling for configuration and performance of a grant-free uplink transmission.

As shown in FIG. 8, in some aspects, process 800 may include transmitting, to a user equipment (UE), configuration information that indicates a maximum number of transport blocks permitted to be transmitted in one or more transmission occasions in a transmission period of a configured grant for an uplink (UL) transmission (block 810). For example, the base station (e.g., using controller/processor 240, transmit processor 220, TX MIMO processor 230, MOD 232, antenna 234, and/or the like) may transmit, to a UE, configuration information. The configuration information may indicate a maximum number of transport blocks permitted to be transmitted in one or more transmission occasions in a transmission period of a configured grant for a UL transmission. In some aspects, process 800 may include transmitting, to a UE, configuration information that indicates a maximum number of transport blocks permitted to be transmitted in a transmission period of a repeating transmission.

As shown in FIG. 8, in some aspects, process 800 may include receiving an indication to suppress communication of one or more remaining transport blocks of the transmission period other than a set of transport blocks, wherein the set of transport blocks includes fewer transport blocks than the maximum number of transport blocks (block 820). For example, the base station (e.g., using antenna 234, DEMOD 232, MIMO detector 236, receive processor 238, controller/processor 240, and/or the like) may receive an indication to suppress communication of one or more remaining transport blocks of the transmission period other than a set of transport blocks. The set of transport blocks may include fewer transport blocks than the maximum number of transport blocks. In some aspects, the indication may explicitly indicate to release the one or more remaining transport blocks. In some aspects, the indication may implicitly indicate to release the one or more remaining transport blocks. For example, the indication may identify a number of remaining transport blocks of the transmission period to be used by the UE, and the number of remaining transport blocks may be lower than a total remaining number of transport blocks of the transmission period. In this case, the base station may determine that one or more remaining transport blocks of the transmission period are to be released based at least in part on the indication. In some aspects, process 800 may include receiving an indication to release one or more remaining transport blocks of the transmission period other than a set of transport blocks, wherein the set of transport blocks includes fewer transport blocks than the maximum number of transport blocks.

As shown in FIG. 8, in some aspects, process 800 may include receiving the UL transmission of the set of transport blocks in the transmission period (block 830). For example, the base station (e.g., using antenna 234, DEMOD 232, MIMO detector 236, receive processor 238, controller/processor 240, and/or the like) may receive the UL transmission in the transmission period. In some aspects, process 800 may include receiving the set of transport blocks in the transmission period.

Process 800 may include additional aspects, such as any single aspect or any combination of aspects described below and/or in connection with one or more other processes described elsewhere herein.

In a first aspect, the one or more transmission occasions include a non-continuous group of slots or a non-continuous group of mini-slots, and a time gap between two transmission occasions is based at least in part on a processing time of the base station for receiving the indication.

In a second aspect, alone or in combination with the first aspect, the indication includes a front-loaded demodulation reference signal (DMRS).

In a third aspect, alone or in combination with one or more of the first and second aspects, the indication is a one-bit indication, and wherein a DMRS pattern of the indication indicates that the one or more remaining transport blocks are to be suppressed in the transmission period after a transport block associated with the DMRS.

In a fourth aspect, alone or in combination with one or more of the first through third aspects, the indication is an N bit indication and a value of N is based at least in part on an actual number of transport blocks, of the set of transport blocks, to be transmitted in the transmission period.

In a fifth aspect, alone or in combination with one or more of the first through fourth aspects, the indication is based at least in part on deterministic multiplexing with an uplink shared channel of the set of transport blocks.

In a sixth aspect, alone or in combination with one or more of the first through fifth aspects, respective hybrid automatic repeat request (HARQ) process numbers of the set of transport blocks are continuous.

In a seventh aspect, alone or in combination with one or more of the first through sixth aspects, a starting HARQ process number of the set of transport blocks is determined based at least in part on one or more of a periodicity of the one or more transmission occasions, the maximum number of transport blocks, or an absolute time index of the transmission.

In an eighth aspect, alone or in combination with one or more of the first through seventh aspects, the process 800 may include transmitting an uplink grant that includes a code block group (CBG) transmission information field; and receiving a retransmission of the set of transport blocks based at least in part on the uplink grant.

In a ninth aspect, alone or in combination with one or more of the first through eighth aspects, receiving the set of transport blocks in the transmission period based at least in part on the configuration information comprises receiving the set of transport blocks based at least in part on an uplink grant or a Layer 1 signal indicating an activation of the one or more transmission occasions.

In a tenth aspect, alone or in combination with one or more of the first through ninth aspects, the uplink grant or the Layer 1 signal indicates a diminished maximum number of transport blocks relative to the maximum number of transport blocks indicated by the configuration information, and the set of transport blocks includes fewer transport blocks than the diminished maximum number of transport blocks.

In an eleventh aspect, alone or in combination with one or more of the first through tenth aspects, the process 800 may include performing a different transmission than the transmission of the set of transport blocks using at least part of the one or more remaining transport blocks.

In some aspects, the set of transport blocks is received in a continuous group of slots or a continuous group of mini-slots. In some aspects, a gap between two transport blocks of the set of transport blocks is fixed. In some aspects, the set of transport blocks is received in a non-continuous group of slots or a non-continuous group of mini-slots. In some aspects, the set of transport blocks is received in an interleaved pattern with another set of transport blocks.

In some aspects, the indication includes a front-loaded demodulation reference signal (DMRS). In some aspects, the indication uses a first DMRS pattern, and wherein a second DMRS pattern indicates that the one or more additional transport blocks are to be received in the transmission period after the transport block associated with the DMRS. In some aspects, the DMRS pattern includes at least one or more of a DMRS sequence, a cyclic shift, or a transmission comb value.

In some aspects, the indication is an N bit indicator and a value of N is based at least in part on a number of the one or more remaining transport blocks to be received in the transmission period. In some aspects, the indication is multiplexed with an uplink shared channel of the set of transport blocks to permit the indication to be decoded before the uplink shared channel is decoded. In some aspects, each transport block of the set of transport blocks is associated with a respective hybrid automatic repeat request (HARQ) process number. In some aspects, a HARQ process number of a particular transport block of the set of transport blocks is determined based at least in part on one or more of: a configured maximum number of HARQ processes, the maximum number of transport blocks, or a time-domain resource allocation for the transport block. In some aspects, the HARQ process number is based at least in part on the one or more remaining transport blocks of the maximum number of transport blocks.

In some aspects, the base station may transmit an uplink grant that includes a code block group (CBG) transmission information field; and receive a retransmission of the set of transport blocks based at least in part on the uplink grant. In some aspects, the retransmission of the set of transport blocks is based at least in part on a code block group (CBG) based configuration, wherein each bit in the CBG information field indicates a subset of transport blocks for retransmission. In some aspects, when a code block group (CBG) based configuration is not supported by the UE, the uplink grant comprises downlink control information for a single transport block of the set of transport blocks. In some aspects, receiving the set of transport blocks in the transmission period based at least in part on the configuration information comprises: receiving the set of transport blocks without transmitting an uplink grant or a Layer 1 signal indicating to transmit the set of transport blocks.

In some aspects, receiving the set of transport blocks in the transmission period based at least in part on the configuration information comprises: receiving the set of transport blocks based at least in part on an uplink grant or a Layer 1 signal indicating an activation of the repeated transmission of the set of transport blocks. In some aspects, the grant or the Layer 1 signal indicates a diminished maximum number of transport blocks relative to the maximum number of transport blocks indicated by the configuration information, and the transmission of the set of transport blocks includes fewer transport blocks than the diminished maximum number of transport blocks.

In some aspects, the base station may receive or schedule a communication on the one or more remaining transport blocks based at least in part on the indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with various aspects of the present disclosure. Example process 900 is an example where a UE (e.g., UE 120) performs signaling for configuration and performance of a grant-based uplink transmission.

As shown in FIG. 9, in some aspects, process 900 may include receiving a control channel that schedules a set of transport blocks to be transmitted, wherein the UE is permitted to transmit fewer than all of the set of transport blocks (block 910). For example, the UE (e.g., using antenna 252, DEMOD 254, MIMO detector 256, receive processor 258, controller/processor 280, and/or the like) may receive a control channel. The control channel may schedule a set of transport blocks to be transmitted. The UE may be permitted to transmit fewer than all of the set of transport blocks.

As shown in FIG. 9, in some aspects, process 900 may include transmitting, when a subset of transport blocks to be transmitted by the UE includes fewer transport blocks than the set of transport blocks, an indication to release one or more remaining transport blocks, of the set of transport blocks, other than the subset of transport blocks (block 920). For example, the UE (e.g., using controller/processor 280, transmit processor 264, TX MIMO processor 266, MOD 254, antenna 252, and/or the like) may transmit an indication to release one or more remaining transport blocks, of the set of transport blocks, other than a subset of transport blocks. The subset of transport blocks to be transmitted by the UE may include fewer transport blocks than the set of transport blocks. In some aspects, the subset of transport blocks may be included in the set of transport blocks.

As shown in FIG. 9, in some aspects, process 900 may include transmitting the subset of transport blocks (block 930). For example, the UE (e.g., using controller/processor 280, transmit processor 264, TX MIMO processor 266, MOD 254, antenna 252, and/or the like) may transmit the subset of transport blocks. In some aspects, the UE may not transmit the one or more remaining transport blocks. In some aspects, the UE may receive scheduling information for the one or more remaining transport blocks, and may perform a transmission on the one or more remaining transport blocks in accordance with the scheduling information.

Process 900 may include additional aspects, such as any single aspect or any combination of aspects described in connection with one or more other processes described elsewhere herein.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving radio resource control (RRC) configuration information that indicates a resource allocation of a maximum number of transport blocks permitted to be transmitted in one or more transmission occasions in a transmission period corresponding to a grant-free uplink (UL) transmission;

transmitting, based at least in part on a set of transport blocks to be transmitted in the transmission period including fewer transport blocks than the maximum number of transport blocks, an indication that one or more remaining transport blocks of the transmission period, other than the set of transport blocks, are not to be transmitted from the UE, wherein the indication is a one-bit indication in one or more starting symbols of the set of transport blocks, and the indication comprises a front-loaded demodulation reference signal (DMRS), and wherein a DMRS pattern of the DMRS indicates that the one or more remaining transport blocks are not to be transmitted in the transmission period after a transport block associated with the front-loaded DMRS; and performing the grant-free UL transmission of the set of transport blocks in the transmission period in accordance with the indication and based at least in part on the configuration information.

2. The method of claim 1, wherein the one or more transmission occasions include a non-continuous group of slots or a non-continuous group of mini-slots.

3. The method of claim 2, wherein a time gap between two transmission occasions is based at least in part on a processing time for receiving the indication.

4. The method of claim 1, wherein the DMRS pattern includes at least one of:

a DMRS sequence, a cyclic shift, or a transmission comb value.

5. The method of claim 1, wherein transmitting the indication comprises:

encoding the indication and the set of transport blocks using different encoding schemes; and mapping the indication and the set of transport blocks to different resource elements.

6. The method of claim 1, wherein respective hybrid automatic repeat request (HARQ) process numbers of the set of transport blocks are continuous.

7. The method of claim 6, wherein a starting HARQ process number of the set of transport blocks is determined based at least in part on one or more of:

a periodicity of the one or more transmission occasions, the maximum number of transport blocks, or an absolute time index of the transmission.

8. The method of claim 7, wherein the starting HARQ process number is based at least in part on an actual number of transport blocks included in the set of transport blocks.

9. The method of claim 1, further comprising:

performing a retransmission of the set of transport blocks based at least in part on an uplink grant, wherein the uplink grant includes a code block group (CBG) transmission information field.

10. The method of claim 9, wherein the retransmission of the set of transport blocks is based at least in part on a CBG based configuration, wherein each bit in the CBG transmission information field indicates a respective subset of transport blocks for retransmission.

11. The method of claim 9, wherein, when a CBG based configuration is not supported by the UE, the uplink grant comprises downlink control information for retransmission of a single transport block of the set of transport blocks.

12. The method of claim 1, wherein the indication is transmitted in an earliest available resource after determining that the set of transport blocks includes fewer transport blocks than the maximum number of transport blocks.

13. The method of claim 1, wherein the UE is permitted to transmit fewer than the maximum number of transport blocks.

14. The method of claim 1, wherein the indication identifies the one or more remaining transport blocks or the set of transport blocks.

15. A method of wireless communication performed by a base station, comprising:

transmitting, to a user equipment (UE), radio resource control (RRC) configuration information that indicates a resource allocation of a maximum number of transport blocks permitted to be transmitted in one or more transmission occasions in a transmission period corresponding to a grant-free uplink (UL) transmission;

receiving an indication that one or more remaining transport blocks of the transmission period, other than a set of transport blocks, are not to be transmitted from the UE, wherein the set of transport blocks includes fewer transport blocks than the maximum number of transport blocks, wherein the indication is a one-bit indication in one or more starting symbols of the set of transport blocks, and the indication comprises a front-loaded demodulation reference signal (DMRS), and wherein a DMRS pattern of the DMRS indicates that the one or more remaining transport blocks are not to be transmitted in the transmission period after a transport block associated with the front-loaded DMRS; and receiving the grant-free UL transmission of the set of transport blocks in the transmission period in accordance with the indication.

16. The method of claim 15, wherein the one or more transmission occasions include a non-continuous group of slots or a non-continuous group of mini-slots, and wherein a time gap between two transmission occasions is based at least in part on a processing time of the base station for receiving the indication.

17. The method of claim 15, wherein the indication is encoded with the set of transport blocks using different encoding schemes and wherein the indication and the set of transport blocks are mapped to different resource elements.

18. The method of claim 17, wherein respective hybrid automatic repeat request (HARQ) process numbers of the set of transport blocks are continuous, and wherein a starting HARQ process number of the set of transport blocks is determined based at least in part on one or more of:

a periodicity of the one or more transmission occasions, the maximum number of transport blocks, or an absolute time index of the transmission.

19. The method of claim 15, further comprising:

transmitting an uplink grant that includes a code block group (CBG) transmission information field; and receiving a retransmission of the set of transport blocks based at least in part on the uplink grant.

20. The method of claim 19, wherein the retransmission of the set of transport blocks is based at least in part on a CBG based configuration, wherein each bit in the CBG transmission information field indicates a respective subset of transport blocks for retransmission.

21. The method of claim 19, wherein, when a CBG based configuration is not supported by the UE, the uplink grant comprises downlink control information for retransmission of a single transport block of the set of transport blocks.

22. A user equipment (UE) for wireless communication, comprising:

one or more memories; and one or more processors, coupled to the one or more memories, which are configured, individually or in any combination, to:

receive radio resource control (RRC) configuration information that indicates a resource allocation of a maximum number of transport blocks permitted to be transmitted in one or more transmission occasions in a transmission period corresponding to a grant-free uplink (UL) transmission;

transmit, based at least in part on a set of transport blocks to be transmitted in the transmission period including fewer transport blocks than the maximum number of transport blocks, an indication that one or more remaining transport blocks of the transmission period, other than the set of transport blocks, are not to be transmitted from the UE, wherein the indication is a one-bit indication in one or more starting symbols of the set of transport blocks, and the indication comprises a front-loaded demodulation reference signal (DMRS), and wherein a DMRS pattern of the DMRS indicates that the one or more remaining transport blocks are not to be transmitted in the transmission period after a transport block associated with the front-loaded DMRS; and perform the grant-free UL transmission of the set of transport blocks in the transmission period in accordance with the indication and based at least in part on the configuration information.

23. A base station for wireless communication, comprising:

one or more memories; and one or more processors, coupled to the one or more memories, which are configured, individually or in any combination, to:

transmit, to a user equipment (UE), radio resource control (RRC) configuration information that indicates a resource allocation of a maximum number of transport blocks permitted to be transmitted in one or more transmission occasions in a transmission period corresponding to a grant-free uplink (UL) transmission;

receive an indication that one or more remaining transport blocks of the transmission period, other than a set of transport blocks, are not to be transmitted from the UE, wherein the set of transport blocks includes fewer transport blocks than the maximum number of transport blocks, wherein the indication is a one-bit indication in one or more starting symbols of the set of transport blocks, and the indication comprises a front-loaded demodulation reference signal (DMRS), and wherein a DMRS pattern of the DMRS indicates that the one or more remaining transport blocks are not to be transmitted in the transmission period after a transport block associated with the front-loaded DMRS; and receive the grant-free UL transmission of the set of transport blocks in the transmission period in accordance with the indication.

24. The method of claim 1, further comprising:

receiving physical downlink control channel (PDCCH) communication indicating a second maximum number of transport blocks, wherein the second maximum number of transport block is less than the maximum number of transport blocks.

* * * * *